United States Patent
Lang et al.

(10) Patent No.: US 7,373,656 B2
(45) Date of Patent: May 13, 2008

(54) AUTOMATIC CONFIGURATION FOR PORTABLE DEVICES

(75) Inventors: Alex Lang, Raleigh, NC (US); Shimon S. Shmueli, Vienna, VA (US); David W. Sharp, Chapel Hill, NC (US); Brian J. Adkins, Morrisville, NC (US)

(73) Assignee: Sandisk IL Ltd., Kfar Saba (IL)

( * ) Notice: Subject to any disclaimer, the term of this patent is extended or adjusted under 35 U.S.C. 154(b) by 875 days.

(21) Appl. No.: 09/853,827

(22) Filed: May 11, 2001
(Under 37 CFR 1.47)

(65) Prior Publication Data

US 2002/0078367 A1 Jun. 20, 2002

(51) Int. Cl.
*G06K 19/00* (2006.01)
*H04L 9/00* (2006.01)

(52) U.S. Cl. .......................................... 726/3; 713/159
(58) Field of Classification Search ................ 713/176; 726/4
See application file for complete search history.

(56) References Cited

U.S. PATENT DOCUMENTS

| | | | |
|---|---|---|---|
| 5,404,485 A | 4/1995 | Ban | 395/425 |
| 5,497,455 A | 3/1996 | Suga et al. | 395/159 |
| 5,519,843 A | 5/1996 | Moran et al. | 395/430 |
| 5,535,357 A | 7/1996 | Moran et al. | 395/430 |
| 5,777,903 A | 7/1998 | Piosenka et al. | 364/700 |
| 5,778,071 A * | 7/1998 | Caputo et al. | 713/159 |
| 5,781,723 A | 7/1998 | Yee et al. | 713/200 |
| 5,799,168 A | 8/1998 | Ban | 395/430 |
| 5,815,577 A * | 9/1998 | Clark | 380/52 |
| 5,907,620 A * | 5/1999 | Klemba et al. | 713/189 |
| 5,937,425 A | 8/1999 | Ban | 711/103 |
| 5,954,808 A | 9/1999 | Paul | 710/104 |
| 5,960,085 A | 9/1999 | de la Huerga | 380/25 |
| 5,987,612 A | 11/1999 | Takagawa et al. | 713/201 |
| 6,003,135 A * | 12/1999 | Bialick et al. | 713/201 |
| 6,040,851 A * | 3/2000 | Cheng et al. | 725/132 |
| 6,055,314 A * | 4/2000 | Spies et al. | 380/228 |
| 6,084,968 A * | 7/2000 | Kennedy et al. | 380/259 |
| 6,088,802 A | 7/2000 | Bialick et al. | 713/200 |
| 6,095,412 A | 8/2000 | Bertina et al. | 235/380 |
| 6,101,482 A | 8/2000 | DiAngelo et al. | 705/26 |
| 6,101,483 A | 8/2000 | Petrovich et al. | 705/26 |

(Continued)

OTHER PUBLICATIONS

Ecommerce-guide.com, "BuyWiz Unveils Universal Shopping Cart", www.ecommerce.internet.com/news/insights/trends, Aug. 29, 1999.

(Continued)

*Primary Examiner*—Nasser Moazzami
*Assistant Examiner*—Brandon S Hoffman
(74) *Attorney, Agent, or Firm*—Winthrow & Terranova, PLLC

(57) ABSTRACT

The present invention relates to a portable device configured to interact with any number of host computing devices. In operation, the portable device will initially appear to a host computing device as a known device type. The host computing device will be configured to interact with the portable device as the known device type. Upon such interaction, the host computing device will access indicia sufficient to identify the portable device as a second device type and instruct the host computing device to configure itself to interact with the portable device as the second device type.

17 Claims, 4 Drawing Sheets

U.S. PATENT DOCUMENTS

| | | | |
|---|---|---|---|
| 6,148,354 A | 11/2000 | Ban et al. | 710/102 |
| 6,182,217 B1 * | 1/2001 | Sedlak | 713/172 |
| 6,199,114 B1 | 3/2001 | White et al. | 709/229 |
| 6,282,522 B1 | 8/2001 | Davis et al. | 705/41 |
| 6,334,216 B1 | 12/2001 | Barth | 725/30 |
| 6,351,813 B1 * | 2/2002 | Mooney et al. | 713/185 |
| 6,385,729 B1 | 5/2002 | DiGiorgio et al. | 713/201 |
| 6,397,224 B1 | 5/2002 | Zubeldia et al. | 707/102 |
| 6,425,084 B1 * | 7/2002 | Rallis et al. | 713/185 |
| 6,434,530 B1 | 8/2002 | Sloane et al. | 705/1 |
| 6,453,342 B1 | 9/2002 | Himmel et al. | 709/213 |
| 6,460,076 B1 | 10/2002 | Srinivasan | 709/219 |
| 6,481,621 B1 | 11/2002 | Herrendoerfer et al. | 235/380 |
| 6,529,992 B1 * | 3/2003 | Thomas et al. | 711/1 |
| 6,550,672 B1 | 4/2003 | Tarcy et al. | 235/383 |
| 6,567,915 B1 | 5/2003 | Guthery | 713/168 |
| 6,581,072 B1 | 6/2003 | Mathur et al. | 707/104.1 |
| 6,609,113 B1 | 8/2003 | O'Leary et al. | 705/39 |
| 6,708,272 B1 * | 3/2004 | McCown et al. | 713/151 |
| 6,738,901 B1 | 5/2004 | Boyles et al. | 713/159 |
| 6,775,770 B1 * | 8/2004 | Davis et al. | 713/156 |
| 6,792,464 B2 | 9/2004 | Hendrick | 709/227 |
| 7,117,369 B1 * | 10/2006 | Burns et al. | 713/182 |
| 2002/0034301 A1 * | 3/2002 | Andersson | 380/270 |
| 2002/0052806 A1 | 5/2002 | Hodson et al. | 705/27 |

OTHER PUBLICATIONS

Anonymous, "Wireless Local Area Network Cuts Costs, Setup Time", Modern Materials Handling, Jun. 1997, Scan Tech News, p. S-24.

"Portable Internet Settings", IBM Technical Disclosure Bulletin, vol. 40, Issue No. 12, pp. 183-184, Dec. 1997.

* cited by examiner

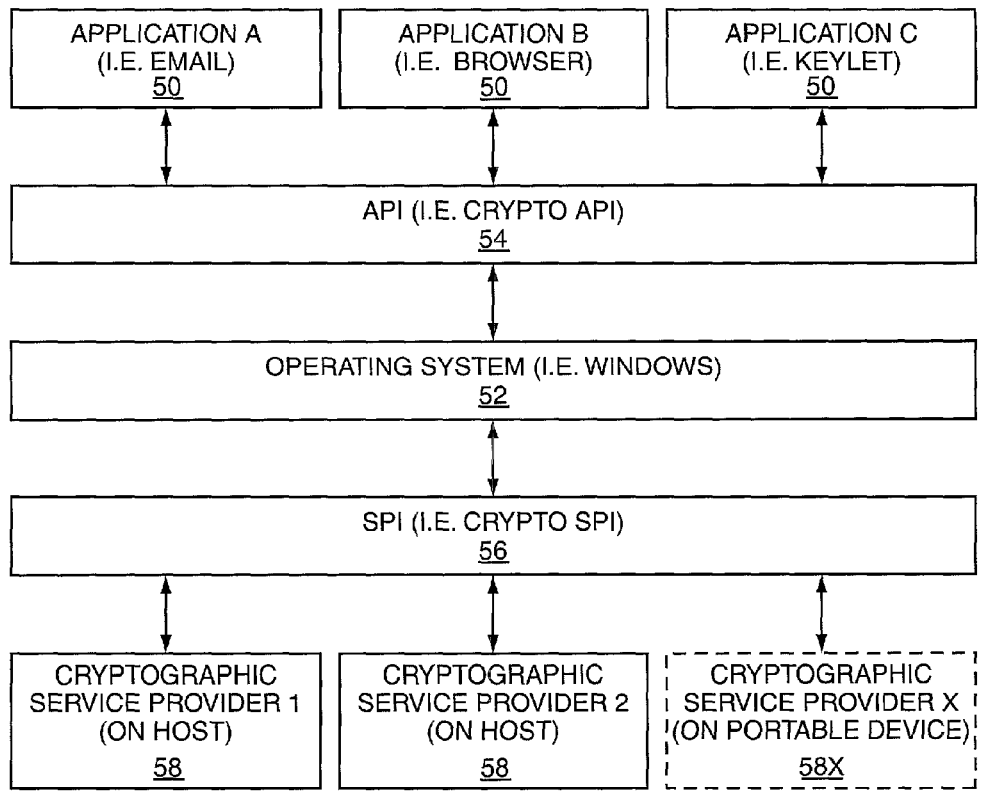
FIG. 3
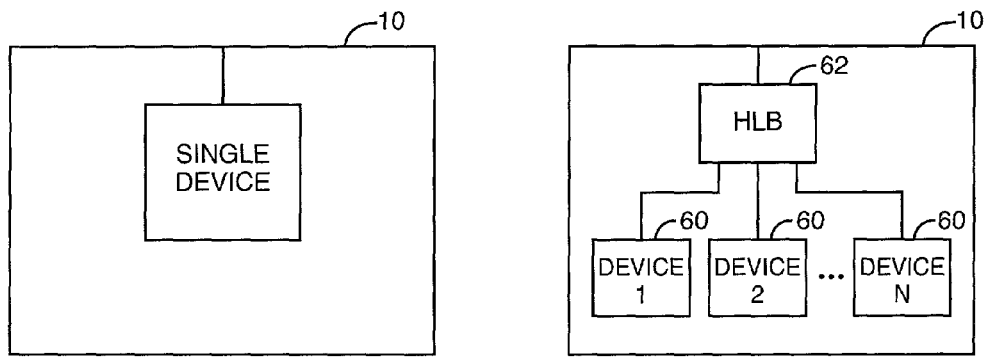
FIG. 4A   FIG. 4B

AUTOMATIC CONFIGURATION FOR PORTABLE DEVICES

RELATED APPLICATIONS

Applications related to the present invention include provisional application Ser. No. 60/243,816, filed Oct. 27, 2000, entitled PORTABLE PRIVACY AND CONFIGURATION FOR COMPUTER AND WEB BASED APPLICATIONS; and utility application Ser. No. 09/802,691, entitled PREFERENCE PORTABILITY FOR COMPUTING, Ser. No. 09/802,634, entitled ACCOUNT PORTABILITY FOR COMPUTING, Ser. No. 09/803,601, entitled SHOPPING CART PORTABILITY FOR COMPUTING, Ser. No. 09/803,291, entitled PORTABLE INTERFACE FOR COMPUTING, and Ser. No. 09/803,290, entitled PRIVACY ASSURANCE FOR PORTABLE COMPUTING, all filed Mar. 9, 2001, the disclosures of which are incorporated herein by reference in their entirety.

FIELD OF THE INVENTION

The present invention relates to portable devices to facilitate computing, and in particular, relates to a portable device capable of interacting with a computing device to facilitate portability of cryptography services.

BACKGROUND OF THE INVENTION

Using multiple computers and multiple computing devices is becoming commonplace. The need or desire for people to use more than one computer in addition to mobile computing devices, such as personal digital assistants (PDAs) and mobile telephones accessing the Internet, is increasing for private and business use. These users frequently use applications to access the Internet and send email, and require cryptography in association with these applications to authenticate, secure, or otherwise protect transmitted and transactional information. Many operating systems, such as Microsoft® Windows®, use specialized services such as a cryptographic service provider (CSP) to implement desired cryptographic standards and algorithms. Typically, a CSP consists of a dynamic-link library (DLL) that implements defined functions in a system program interface, such as Microsoft® Crypto SPI. CSPs typically cooperate with a cryptography application program interface (API) to serve cryptography functions required by applications. CSPs may be any combination of software and hardware, and may implement their functionality in association with a computer device's operating system and processor, or separately in an associated device having its own processing capability.

In a Windows environment, the cryptographic device, such as a CSP, must be installed and registered with the host. This typically involves copying software to the host and modifying configuration data so that the operating system, and particularly the necessary API is aware of the presence of the CSP or the device providing the services of the CSP. Thus, for a user to access and implement cryptographic services on multiple devices, the necessary software or hardware must be installed on each host prior to being able to use the services, if these services are not already installed on the desired host.

Given the ever-increasing need for security and cryptography services, users need to take additional precautions to protect encryption keys and related cryptography functions when using multiple devices. As such, there is a need to provide a secure and efficient way to transport cryptography services from one device to another, while eliminating the need to separately install and register cryptography services and devices on each host.

SUMMARY OF THE INVENTION

The present invention relates to a portable device configured to interact with any number of host computing devices. The portable device primarily includes memory associated with an interface to facilitate interaction with the host computing devices. The portable device may include control circuitry to assist in interactions with the host computing devices, as well as to execute software and organize data stored thereon.

In operation, the portable device will initially appear to a host computing device as a known device type. The host computing device will be configured to interact with the portable device as the known device type. Upon such interaction, the host computing device will access indicia sufficient to identify the portable device as a second device type and instruct the host computing device to configure itself to interact with the portable device as the second device type. The indicia may be provided in hardware, firmware, software, data, or any combination thereof. The second device type is preferably configured to provide a service for applications running on the host computing device.

In a preferred embodiment, the second device type is a cryptographic service provider (CSP) capable of providing cryptography services for applications running on the host computing device. The known device type will preferably emulate a mass storage device readily accessible and addressable by the host computing device upon recognition. Software or data provided in the memory of the device is preferably accessible and executable by the host computing device. The data may include keys for encryption/decryption, cryptography algorithms, and the like. Notably, portable devices equipped with processing capabilities may operate to provide processing for the services provided by the second device type on the portable device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of the specification illustrate several aspects of the invention, and together with the description serve to explain the principles of the invention.

FIG. 3 illustrates a software architecture according to a preferred embodiment of the present invention.

FIG. 4A illustrates a logical architecture of a portable device emulating a single device.

FIG. 4B illustrates a logical architecture of a portable device emulating multiple devices.

DETAILED DESCRIPTION OF THE PREFERRED EMBODIMENTS

The present invention provides a portable device capable of interfacing with a number of host computing devices. The portable device is preferably configured to automatically interact with a host to install and register cryptography services provided by software or hardware on the portable device for use by applications capable of running on the host. The applications may be pre-installed on the host, or may be provided on the portable device itself and executed on the host as desired.

The portable device is preferably configured to appear as a memory device, including the necessary software and data to facilitate cryptographic services. The software and data may be accessed and used by the host operating system to facilitate cryptographic services. Alternatively, the portable device may include processing capability sufficient to provide a portion of or all of the necessary cryptography functions required by applications running on the host. Preferably, the portable device will store cryptography keys, such as private and perhaps public keys used for encryption and decryption. The portable device may also include any other type of authentication or verification indicia necessary for operation. Although this specification focuses on the use of a cryptographic service provider (CSP), those skilled in the art will recognize alternative service providers and functions falling within the concepts of the described invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these applications and concepts fall within the scope of this disclosure and the accompanying claims. Prior to delving into the detailed operation of the present invention, the basic environment and configuration of the portable device is described. Details of the specific operation and functionality of the invention follow.

Figure 1:
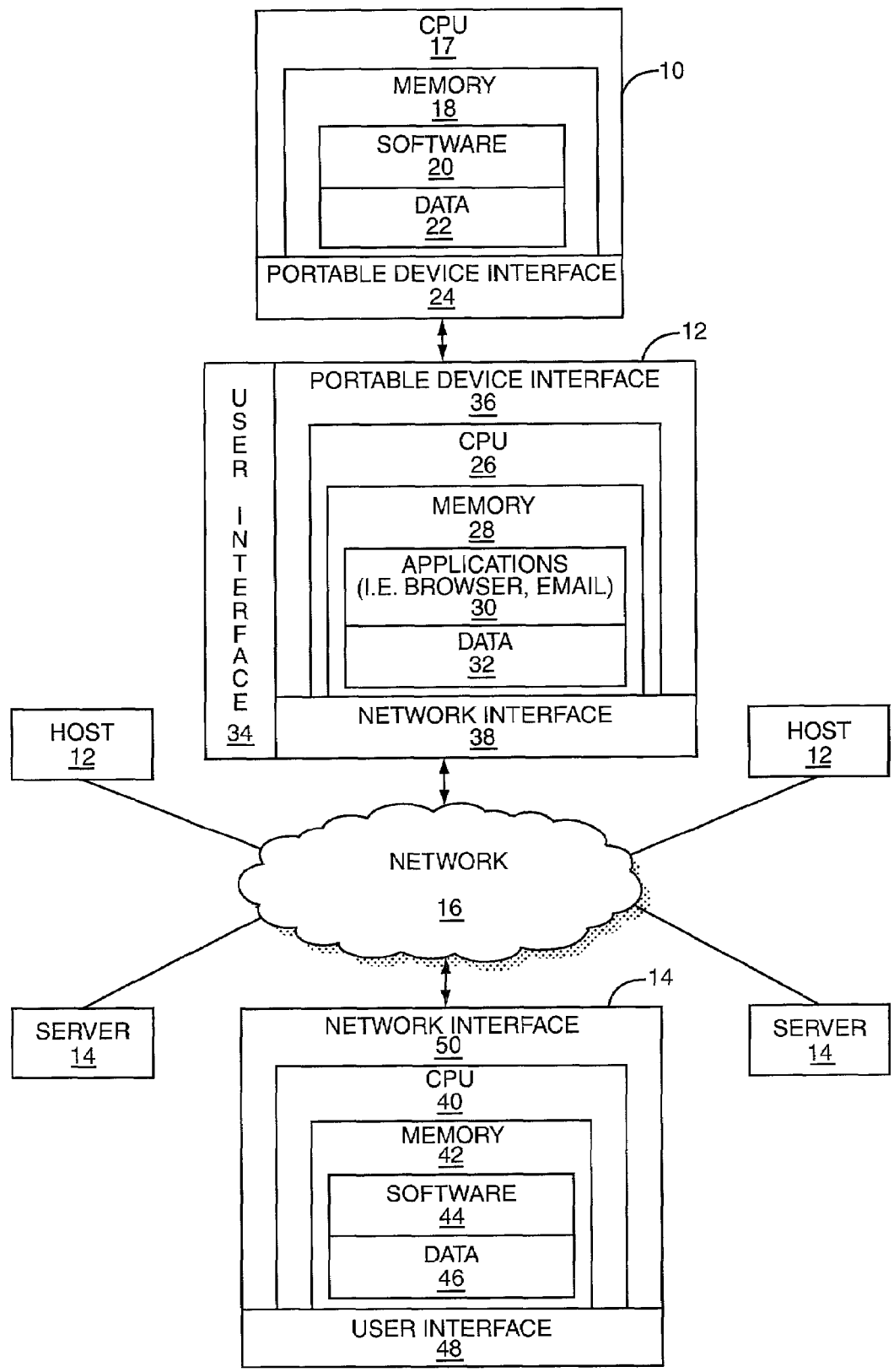
FIG. 1 is an illustration of a computing environment compatible with the operation of the present invention.

With reference to FIG. 1, a basic representation of a computing environment consistent with the implementation of the present invention is illustrated. At the heart of the invention is the portable device 10, which may be referred to as a key. The portable device 10 is configured to interact with any number of computing devices, which are referred to as hosts 12. Each host 12 will typically interact with one or more servers 14 via a network 16, which may include a local area network (LAN), the Internet, or a combination thereof.

The portable device 10 may include a central processing unit (CPU) 17 having memory 18 associated with software 20 capable of running on one of the hosts 12, and data 22. The memory 18 will be associated with a portable device interface 24 to facilitate an interface with one or more of the hosts 12. Preferably, once an interaction between the portable device 10 and a host 12 is established, the memory 18 will emulate a file system on a memory device, such as a hard disk drive, accessible by the host 12 wherein at least certain aspects of the software 20 are capable of running or executing on the host 12. Further detail is provided below.

In the preferred embodiment, the portable device 10 will include four or more megabytes of flash memory and a built-in USB sleeve interface. When the portable device 10 is plugged into a USB port of a host 12, the portable device 10 may emulate a file system on a solid state mass storage device, and via plug-and-play functionality, rely on device drivers that are typically associated with the host's operating system. The portable device 10 is preferably configured for auto run capability, which is described in detail below. This configuration will allow a start-up application stored on the portable device 10 to start executing when the portable device 10 is plugged in to the USB port of the host 12.

Those skilled in the art will recognize a variety of configurations for the portable device 10 wherein when the portable device 10 is placed into or associated with the host 12, one or more keylets or other applications, functions, or the like are automatically executed by the host 12. The organization of the memory 18 will preferably resemble a file structure addressable by the host 12. Preferably, the software 20 will include Java applets, Active-X components, or the like capable of automatically running on the host 12 upon engaging the portable device 10 with the host 12, or otherwise establishing an interaction between the two devices. Additional detail is provided below.

The host 12 may take many forms, including a personal computer (PC), workstation, personal digital assistant (PDA), notebook computer, web-enabled mobile telephone, or the like. The host 12, regardless of form, will typically include a CPU 26 associated with memory 28 having the requisite software 30 and data 32 for operation. Typically, a user interface 34 is provided to facilitate interaction with the host's user, which is preferably the owner of the portable device 10, who is interacting with the host 12. The CPU 26 is preferably associated with a host interface 36 to facilitate interaction with the portable device 10, and a network interface 38 to facilitate interaction with any number of devices associated with network 16, such as the servers 14.

Importantly, certain software 20 on the portable device 10 is configured to readily execute on the host 12 upon interface. For example, the portable device 10 may be compatible with Windows plug-and-play or autorun capability, and the portable device interface 24 may be USB compatible, wherein when the portable device 10 is plugged into the host interface 36 of the host 12, the host 12 will recognize the portable device 10 and execute select applications or functions provided by the software 20 of the portable device 10.

The host 12 is preferably configured to access various servers 14 over the network 16 upon executing applications or functions of the portable device 10. These servers 14 may be configured in any number of ways. The servers 14 may be traditional application servers facilitating the function of the host 12, or may be web servers capable of downloading markup language content upon request from a browser running on the host 12.

The server 14 will typically include a CPU 40 having memory 42 with the requisite software 44 and data 46 to facilitate operation. The server 14 will typically include a user interface 48 and a network interface 50 cooperating with the CPU 40. The user interface 48 allows a direct interface with the server 14, wherein the network interface 50 facilitates interaction with any number of network devices, including other servers 14 and hosts 12.

Figure 2A:
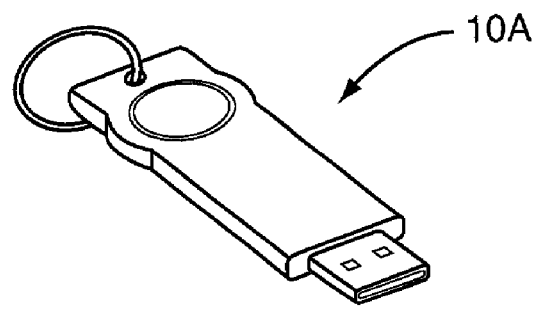
FIG. 2A illustrates a portable key that is capable of being inserted into and interacting with multiple computing devices according to the present invention.
Figure 2B:
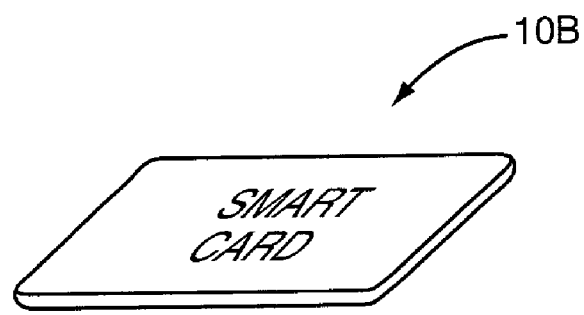
FIG. 2B is a smart card configured to interact with multiple computing devices according to the present invention.
Figure 2C:
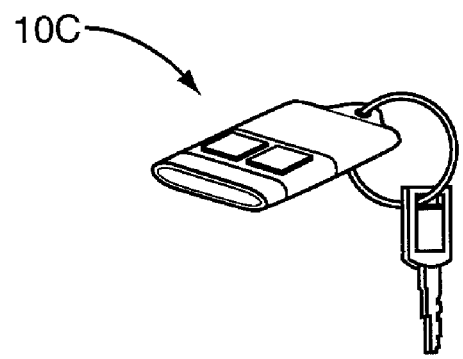
FIG. 2C is a remote communication device, such as a transponder, configured to interact with multiple computing devices according to the present invention.

Turning now to FIGS. 2A-2C, the portable device 10 may take on any number of configurations. The preferred embodiment is shown in FIG. 2A wherein the portable device 10 takes the form of a physical key-like device 10A capable of being plugged into a USB port or other readily accessible port on the host 12. Preferably, the key 10A is light and portable enough to be carried on a key chain or the like. FIG. 2B represents a smart card 10B capable of carrying out the concepts of the present invention. The smart card 10B may be a contact-based or a contactless (wireless) smart card 10B capable of interacting with the host 12 as described above. FIG. 2C depicts a wireless communication device 10C, such as a transponder, capable of facilitating wireless communications with the host 12. Whereas a physical connection with a portable device 10 may implement the Windows plug-and-play interface, a wireless device 10C may incorporate an automatic detection or sensing technology, such as the discovery process used by Bluetooth, which is well documented and available to those skilled in the art. The portable device 10 may also be implemented in a wireless personal digital assistant (PDA), mobile terminal, such as a mobile telephone, or like portable computing device.

The applications or functions stored on the portable device 10 and capable of executing on the host 12 are referred to in general as keylets. Keylets may also reside on a host system itself, depending on the security level associated with that host 12. Typically, keylets are assigned a class indicating the basic functionality of the keylet, and preferably a security level corresponding to the functionality of the keylet. The keylets are preferably Java applets, but may incorporate any software technology facilitating ready execution on a host 12. The keylets may provide any number of functions.

In the preferred embodiment, the portable device 10 acts as a storage device as well as a cryptographic device. The portable device 10 takes advantage of the mass storage persona in order to allow the device to bring along its own cryptographic services, preferably a CSP, to any host 12 that it is plugged into or with which it is associated. As a result of this capability, there is no need for separate installation of the CSP, but rather a keylet present in the portable device 10 runs on the host 12 to access the CSP on the portable device 10 and redirect the host operating system to use the services of the CSP on the portable device 10. Preferably, the cryptography API layer of the operating system is reconfigured to access the CSP on the portable device 10 in lieu of the CSPs residing on the host 12, as necessary. CSPs are well known in the art, and those skilled in the art are directed to the various resources available describing and defining the construction and use of CSPs, particularly those used in a Microsoft operating environment.

In general, the functionality of cryptographic services contained in a CSP depend on the type of task the CSP is requested to perform. As an example, the CSP may be used to provide digital signatures, authenticate the user for physical or electronic access, or encrypt and decrypt transferred media. Typically, CSPs perform one or more of the following functions and services:
Encryption and decryption;
Digital signing and verification;
Hashing;
Generating private and public key pairs;
Generating random numbers for cryptography;
Storing private and perhaps public keys for encryption and decryption services.

CSPs typically provide secure storage for private keys. Various applications may query the services of the CSP through a cryptography API, among other logical layers, to access private keys kept within the CSP. The CSP will control access to private keys and require applications to be authorized to use such private keys. Applications requiring the services of CSPs may interact with one or more CSPs. A CSP may be implemented in software executed by the host, or facilitated in a separate hardware device.

In the present invention, the CSP may be implemented using software 20 stored on the portable device 10 wherein the software 20 is ultimately run by the host processor, or alternatively, the portable device 10 may include processing capabilities capable of performing services, such as cryptography functions by executing software 20 stored on the portable device 10 by the CPU 17 on the portable device 10. Thus, CSPs can be instantiated in hardware, firmware, software, or a combination thereof. Functionally, the distinction should be transparent to the applications requiring the services of the CSP. Typically, applications incorporating a more hardware-intensive embodiment, such as those incorporating the CPU 17 in the portable device 10, are more tamper-resistant than those implemented solely in software, wherein the CSP is actually facilitated using host processing.

As noted, the CSP functions to implement cryptographic standards and algorithms. The CSP consists of a dynamic-link library (DLL) implementing the cryptographic standards and algorithms via a system program interface, such as crypto SPI.

Turning now to FIG. 3, a basic architecture is illustrated according to the present invention. Typically, applications 50, such as email, browser, or keylets from the portable device 10, execute on the host 12 and interact with other applications on the operating system 52 of the host 12 through an API 54. For cryptographic services, the API 54 is preferably a cryptographic API, such as that defined for the Microsoft Windows operating system. Calls from the applications 50 are processed by the API 54 to direct them to the appropriate service for fulfillment. Generally, the applications are not aware of the specific way in which the calls are supported, only that the calls will be responded to in a defined manner. The operating system 52 will pass these calls on to the appropriate CSP 58 through the system program interface (SPI) 56, such as the Crypto SPI. The CSPs 58 are configured to receive defined parameters in a specific order, process these parameters, and return values in an expected order and configuration to the API 54 via the operating system 52 and SPI 56 in traditional fashion.

Applications typically use handles to refer to data objects within a respective CSP 58. Example data objects that are often referenced by their handles include public and private key pairs, session keys, hashing information, and key containers. The operating system 52 will access these various objects using the handles and facilitate coordination between the applications 50 and the CSP 58.

For the present invention, the portable device 10 will include the necessary software to interact with the host 12 when the portable device 10 is plugged into the host 12 or otherwise associated with the host 12, to effectively register and install a CSP 58 provided by the portable device 10 with the host 12. Once installed, the CSP 58X of the portable device 10 appears as any other CSP 58 registered with the operating system 52. Preferably, the portable device 10 will appear to the operating system 52 as a memory device with the necessary software and data to facilitate the CSP 58X, or as a separate device functioning to implement the services of the CSP 58X.

As such, the portable device 10 may appear to the host system as one or more devices, as illustrated in FIGS. 4A and 4B. In FIG. 4A, the portable device 10 appears as a single device, such as a mass storage device, including a floppy disk drive, a hard disk drive, or a CD-ROM, or alternatively, a device having sufficient processing capability to provide the processing services to implement the functions of the CSP 58X. FIG. 4B illustrates a portable device 10 appearing to the host 12 as multiple devices 60 served by a hub 62. In a USB environment, the hub 62 may be implemented as a virtual USB hub, wherein the memory and processing capabilities of the portable device 10 operate to emulate multiple USB devices 60. One device 60 may be a mass storage device, wherein another device 60 may be a hardware device capable of implementing and providing the processing for CSP services. Those skilled in the art will recognize the various embodiments made possible in USB and related wireless, optical, and electrical interface environments.

Figure 5:
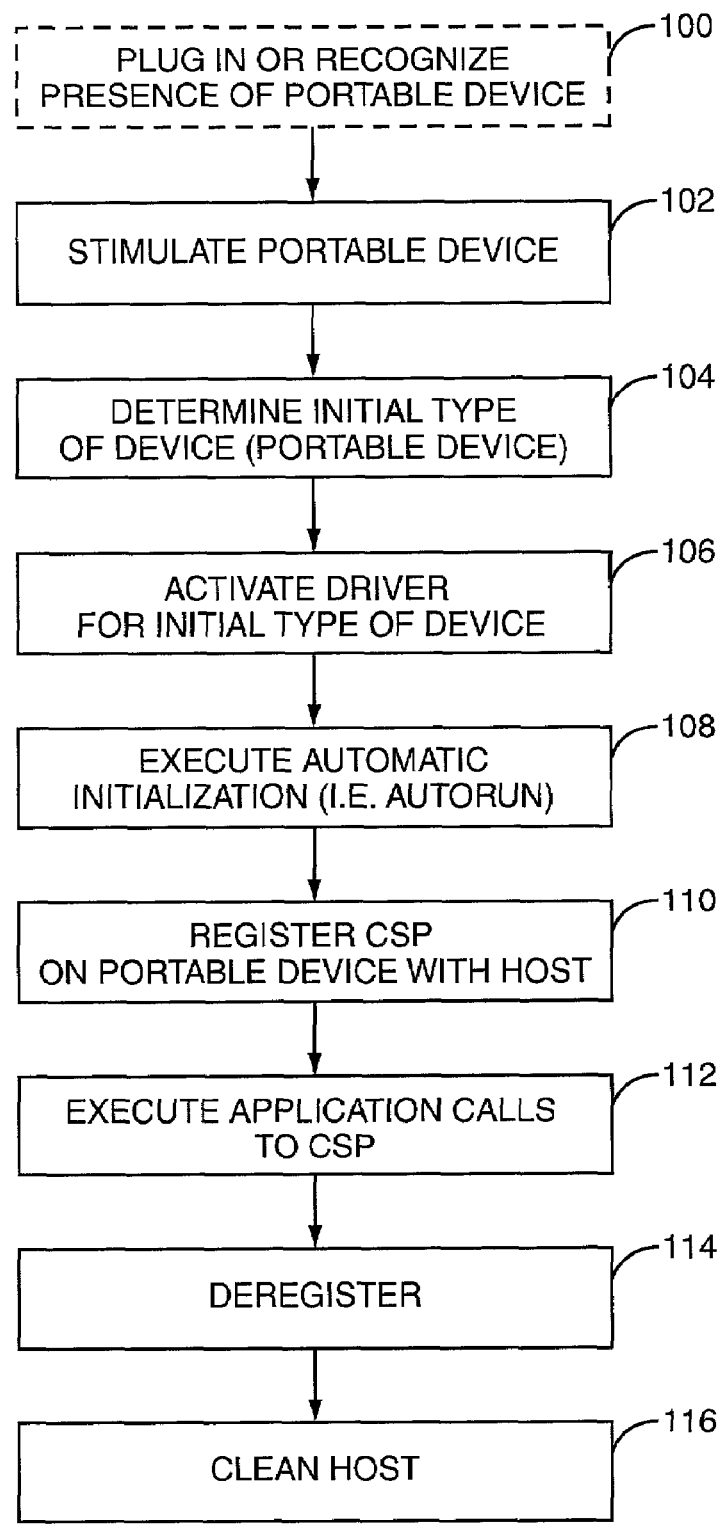
FIG. 5 is a flow chart outlining a basic process for interacting with computing devices according to the present invention.

Turning now to the flow chart of FIG. 5, the operation of the preferred embodiment is described. The operation is described in association with a USB environment. Those skilled in the art will recognize that these concepts are equally applicable to wireless and electrical embodiments, as well as related recognition technologies. Initially, the portable device 10 is plugged into the host 12 or otherwise recognized by the host 12 (block 100). Typically, the USB interface of the host 12 will operate to stimulate the portable device 10 (block 102) in order to receive a response sufficient to identify the portable device 10. The USB interface will receive information from the portable device 10 and determine an "initial" type of device the portable device 10 is representing (block 104). Preferably, the portable device 10 will represent itself as a device other than a CSP, such as a mass storage device, which is readily recognizable by the host 12. The USB interface of the host 12 will identify the new device to the operating system 52 of the host 12. The host 12 will then activate a driver for the type of device portrayed by the portable device 10 (block 106) and execute an automatic initialization sequence (block 108).

Preferably, the automatic initialization uses Microsoft's autorun feature, wherein the portable device 10 will include an executable autorun.inf file in a memory portion accessible and expected by the host 12. The autorun.inf file will include instructions for the operating system to configure the host 12 to recognize the portable device 10 as a CSP 58 or provide instructions to execute a file on the portable device 10 that will configure the host 12 to recognize the device as a CSP 58. Either of these actions will effectively register the CSP 58X provided by or contained on the portable device 10 with the host 12 (block 110). The registration of the CSP 58X will include providing the necessary device drivers or modifying any registries in the operating system or associated APIs to direct calls from the application to the CSP 58X on the portable device 10 as desired.

Although operating systems will vary from device to device, the present invention essentially registers the CSP 58X on the host 12 with the host operating system 52 via a crypto API 54 or like software layer. The result is that applications can access the CSP 58X through the pertinent API 54 to use the services provided by the CSP 58X on the portable device 10. Again, the CSP 58X may be implemented by running software 20 provided by the portable device 10, on the host CPU 26, or having the portable device 10 do the processing and simply returning results in response to calls from applications to the operating system 52 or API 54 (block 112). Notably, the keylets initially provided on and by the portable device 10 are capable of running on the host 12 and may use the CSP 58X, which was automatically installed on the host 12 when the portable device 10 was plugged into or otherwise associated with the host 12.

Given the mobility provided by the present invention, additional keylets or like software may be provided by the portable device 10 to effectively de-register CSPs 58X previously automatically installed in association with using the portable device 10 (block 114). In essence, the keylet will operate to reconfigure the host 12 to its original configuration prior to installing the CSP 58X. De-registering such CSPs 58X will prevent the host 12 from trying to access certain functions, services, or drivers after the portable device 10 has been removed. To provide additional security, the same or additional keylets may operate to remove all or select information from the host 12 indicative of the user's interaction (block 116).

Depending on the keylet being executed, the user may indicate a desire to end the session, wherein the keylets or data involved in the interaction may be updated as necessary. Throughout this process, one or more of the keylets may monitor for the insertion or loss of presence of the portable device 10. If the portable device 10 is not removed, the process will repeat. If the portable device 10 has been removed, one or more of the keylets will preferably continue to run on the host to clean any residue left from the user interaction. Cleansing the residue from the host 12 will preferably include removing any cookies, histories, information in cache, or other memory indicative of the user's interaction. Such a cleansing is also preferable upon a scheduled termination of the session, wherein the cleansing will occur upon the user signaling for an end of the interaction. The automatic cleansing upon removal of the portable device 10 is a safeguard for those forgetting to properly end the session and simply removing the portable device 10 without providing the host 12 forewarning.

The portable devices 10 may have various combinations of memory and interface types. The memory types may include: flash memory with hard disk drive emulation; SRAM-based, typically with hard disk drive emulation and a battery backup; internally mapped device memory; or memory, such as that used in a smart card, which does not require or use hard disk drive emulation. The interfaces may include those standard for personal computers, such as the universal serial bus (USB), IEEE 1392, etc., or wireless interfaces, such as that provided by Bluetooth, IEEE 802.11, and the like.

Regardless of the type of memory and interface, the portable devices 10 will be able to interface to the host 12. In addition to computers, personal digital assistants (PDAs), and mobile telephones, hosts 12 may also include various types of kiosks, such as automated teller machines (ATMs) and the like. Portable devices 10 may emulate various types of Windows- and UNIX-based systems and the like.

Those skilled in the art will recognize certain variations and modifications to the concepts described herein. These variations and modifications are considered within the scope of the disclosure and the claims that follow.

What is claimed is:

1. A portable device for engaging a host computing device comprising:
a body;
a memory within the body containing:

initial identification indicia to initially identify the portable device to the host computing device as a storage device, which is known to the host computing device;

configuration indicia to subsequently identify the portable device to the host computing device as a cryptographic service provider and provide configuration instructions to allow the host computing device to effectively interact with the portable device as the cryptographic service provider; and service indicia providing instructions to provide a service corresponding to the cryptographic service provider;

an interface associated with the memory and adapted to facilitate interaction with the host computing device; and a processing unit associated with the memory, wherein the service indicia includes instructions for the processing unit to provide the service corresponding to the cryptographic service provider to the host computing device.

2. The portable device of claim 1 wherein the service indicia includes instructions for the host computing device to provide the service for applications running on the host computing device.

3. The portable device of claim 1 wherein the configuration indicia includes a file executable on the host computing device to reconfigure the host computing device to recognize and interact with the portable device as the cryptographic service provider.

4. The portable device of claim 3, wherein the portable device further comprises:

cleansing indicia providing instructions for the host computing device to remove at least certain information from the host computing device indicative of the use of the host computing device while associated with the portable device.

5. The portable device of claim 1 wherein the memory further contains an application to run on the host computing device.

6. The portable device of claim 1 wherein said memory further contains at least one of the group consisting of private cryptography key, public cryptography key, and cryptography algorithm.

7. The portable device of claim 1 wherein the interface is one of the group consisting of electrical, optical, and radio frequency.

8. The portable device of claim 1 wherein the memory further contains deregistering indicia providing instructions for the host computing device to reconfigure the host computing device to a configuration state prior to interacting with the portable device.

9. The portable device of claim 1 wherein the body and memory are integrally formed with one another such that the memory is not readily removed from the body.

10. The portable device of claim 1 wherein the memory contains at least four megabytes of flash memory.

11. The portable device of claim 1, wherein the portable device further comprises:

cleansing indicia providing instructions for the host computing device to remove at least certain information from the host computing device indicative of the use of the host computing device while associated with the portable device.

12. The portable device of claim 11 wherein the cleansing indicia includes instructions to de-register the cryptographic service provider so as to prevent access to selected functions, services, and drivers after the portable device has been removed.

13. A method comprising:

a) identifying a portable device to a host computing device as a storage device, which is known to the host computing device;

registering the portable device with the host computing device as the storage device;

automatically identifying the portable device to the host computing device as a cryptographic service provider;

enabling the portable device as the cryptographic service provider with the host computing device based on information provided on the portable device; and providing a service corresponding to the cryptographic service provider for applications running on the host computing device based on the information provided by the portable device.

14. The method of claim 13 further comprising reconfiguring the host computing device to a configuration state prior to interacting with the portable device.

15. The method of claim 13, wherein the providing a service corresponding to the cryptographic service provider for applications running on the host computing device further comprises:

providing instructions for a processing unit associated with a memory of the portable device to provide the service corresponding to the cryptographic service provider to the host computing device.

16. The method of claim 13 further comprising:

executing a file on the host computing device to reconfigure the host computing device to recognize and interact with the portable device as the cryptographic service provider.

17. The method of claim 13 further comprising:

removing at least certain information from the host computing device indicative of use of the host computing device while associated with the portable device.

* * * * *